United States Patent [19]

Sun et al.

[11] Patent Number: 5,455,629
[45] Date of Patent: Oct. 3, 1995

[54] APPARATUS FOR CONCEALING ERRORS IN A DIGITAL VIDEO PROCESSING SYSTEM

[75] Inventors: Huifang Sun, Princeton; Joel W. Zdepski, Lebanon, both of N.J.

[73] Assignee: RCA Thomson Licensing Corporation, Princeton, N.J.

[21] Appl. No.: 17,455

[22] Filed: Feb. 12, 1993

Related U.S. Application Data

[63] Continuation of Ser. No. 789,245, Nov. 7, 1991, abandoned, which is a continuation-in-part of Ser. No. 661,994, Feb. 27, 1991, Pat. No. 5,148,272.

[51] Int. Cl.$^6$ ............................................. H04N 7/12
[52] U.S. Cl. ........................ 348/466; 348/420; 348/426; 348/402
[58] Field of Search ...................... 358/136, 133, 358/135, 138; 371/31; 348/420, 402, 426, 466

[56] References Cited

U.S. PATENT DOCUMENTS

| | | | |
|---|---|---|---|
| 4,807,032 | 2/1989 | Strehl | 348/466 X |
| 4,807,033 | 2/1989 | Kessen et al. | 358/167 |
| 4,876,595 | 10/1989 | Veldhuis | 358/136 |
| 4,989,088 | 1/1991 | Wada et al. | 358/136 |
| 5,115,309 | 5/1992 | Hang | 358/136 X |

(List continued on next page.)

FOREIGN PATENT DOCUMENTS

| | | | |
|---|---|---|---|
| WO87/02210 | 4/1987 | European Pat. Off. | H04N 7/13 |
| WO92/14339 | 8/1992 | European Pat. Off. | H04N 7/13 |
| 2219463 | 6/1989 | United Kingdom | H04N 5/262 |

OTHER PUBLICATIONS

Stafano Tubaro, "A two layers video coding scheme for ATM networks", 8376 Signal Processing Image Communication, 3(1991) Jun., Nos. 2/3, Amsterdam, NE pp. 129–141.

G. Morrison et al., "Two-layer video coding for ATM networks" 8376 Signal Processing Image Communication, 3(1991) Jun., Nos. 2/3, Amsterdam, NE pp. 179–195.

M. Ghanbari, "A motion vector replenishment video codec for ATM networks", 8376 Signal Processing Image Communication, 3(1991) Jun., Nos. 2/3, Amsterdam, NE pp. 143–156.

G. Karlsson et al., "Packet Video and Its Integration into the Network Architecture" 8272 IEEE Journal on Selected Areas in Communications, 7(1989) Jun., No. 5, New York, US pp. 739–751.

H. Tominaga et al., "A video coding method considering cell losses in ATM-based networks", 8376 Signal Processing Image Communication, 3(1991) Sep., No. 4, Amsterdam, NE pp. 291–300.

K. C. Chua et al., "Error detection and correction of vector quantised digital images", 8049i Iee Proceedings–1, 137(1990) Dec., No. 6, Part I, Stevenage, Herts., GB, 417–423.

Shaw-Min Lei et al., "An Entropy Coding System for Digital HDTV Applications," *IEEE Transactions on Circuits and Systems for Video Technology*, vol. 1, No. 1, Mar. 1991, pp. 147–145.

(List continued on next page.)

*Primary Examiner*—Victor R. Kostak
*Attorney, Agent, or Firm*—Joseph S. Tripoli; Eric P. Herrmann; Ronald H. Kurdyla

[57] ABSTRACT

A digital video signal processing system includes apparatus for concealing errors which might occur in reproduced images due to image data lost during signal transmission. The system includes circuitry for detecting transmitted video data, generating error signals if errors are present in segments (transport blocks) of the received data, and excising segments having errors from the data stream. The received data is applied to a decoder/decompressor system which decodes and decompresses the transmitted video data according to a predetermined sequence and applies the decompressed video data to a memory (for subsequent display or recording, etc.). The decompressor is responsive to the error signals for altering the predetermined sequence.

12 Claims, 5 Drawing Sheets

U.S. PATENT DOCUMENTS 5,159,452  10/1992  Kinoshita et al. .................. 348/466
5,243,428  9/1993  Challapali et al. .................. 358/167

OTHER PUBLICATIONS

R. K. Jurgen "The Challenges of Digital HDTV," *IEEE Spectrum* Apr. 1991, pp. 28–30, 71–73.

International Organization for Standardization, "Coding of Moving Pictures and Associated Audio", *ISO–IEC JTC1/SC2/WG11*, MPEG90/176 Rev. 2, Dec. 18, 1990 (MPEG Video Committee Draft).

APPARATUS FOR CONCEALING ERRORS IN A DIGITAL VIDEO PROCESSING SYSTEM

This is a continuation of application Ser. No. 07/789,245, filed Nov. 7, 1991, now abandoned, which is a continuation-in-part of application Ser. No. 661,994, (now U.S. Pat. No. 5,148,272) filed Feb. 27, 1991, and entitled, "APPARATUS FOR RECOMBINING PRIORITIZED VIDEO DATA". The invention relates to concealing image data that is lost during signal transmission.

BACKGROUND OF THE INVENTION

The International Organization for Standardization is currently developing a standard specifying the coded representation of video for digital storage media, supporting a continuous data transfer rate of 1.5 Mbits/sec., which standard is described in the document ISO-IEC JTC1/SC2/WG11; CODING OF MOVING PICTURES AND ASSOCIATED AUDIO; MPEG90/176 Rev. 2, Dec. 18, 1990. This format has become known as MPEG. According to this format sequences of frames are divided into groups, and respective frames within each group are encoded according to one of a plurality of coding modes. Typically the coding modes include intraframe coding, (I frames) and two types of interframe predictive coding (P and B frames). In all modes only odd fields are encoded, the even fields being discarded.

The Advanced Television Research Consortium (ATRC) in the United States has modified the MPEG format for transmission of high definition television (HDTV) signals in digital form. Generally, the initial signal coding of this HDTV signal is similar to MPEG except that the pixel resolution, and data rates are increased, and both odd and even frames of each field are coded. In the HDTV system the coded signal is prioritized between a higher and a lower priority channel for transmission. Coded data having apparent greater importance to picture reproduction is transmitted with a given power level and coded data of lesser importance is transmitted with a lesser power level, to minimize cochannel interference.

FIG. 1 is a pictorial representation of the coding format prior to prioritization. The frame sequence is merely representative. The letters I, P, and B above respective frames indicate the coding mode for the respective frame. The frame sequence is divided into groups of frames (GOF) each of which includes the same coding sequence. Each frame of coded data is divided into slices representing, for example, 16 image lines. Each slice is divided into macroblocks each of which represents, for example, a 16×16 matrix of pixels. Each macroblock is divided into 6 blocks including four blocks of information relating to luminance signal and two blocks of information relating to chrominance signal. The luminance and chrominance information are coded separately and then combined for transmission. The luminance blocks include data relating to respective 8×8 matrices of pixels. Each chrominance block comprises and 8×8 matrix of data relating to the entire 16×16 matrix of pixels represented by the macroblock.

Blocks of data, encoded according to intraframe coding, consist of matrices of Discrete Cosine Coefficients. That is, respective 8×8 blocks of pixels are subjected to a Discrete Cosine Transform (DCT) to provide coded signal. The coefficients are subjected to adaptive quantization, and before being applied to the priority processor are run-length and variable-length encoded. Hence respective blocks of transmitted data may include fewer than an 8×8 matrix of codewords. Macro blocks of intraframe encoded data, will include, in addition to the DCT coefficients, information such as the level of quantization employed, a macroblock address or location indicator, and a macroblock type.

Blocks of data encoded according to P or B interframe coding also consist of matrices of Discrete Cosine Coefficients. In this instance however the coefficients represent residues or differences between a predicted 8×8 pixel matrix and the actual 8×8 pixel matrix. These coefficients are also subjected to quantization and run- and variable-length coding. In the frame sequence I and P frames are designated anchor frames. Each P frame is predicted from the lastmost occurring anchor frame. Each B frame is predicted from one or both of the anchor frames between which it is disposed. The predictive coding process involves generating displacement vectors which indicate which block of an anchor frame most closely matches the block of the predicted frame currently being coded. The pixel data of the matched block in the anchor frame is subtracted, on a pixel-by-pixel basis, from the block of the frame being encoded, to develop the residues. The transformed residues and the vectors comprise the coded data for the predictive frames. As for intraframe coded frames the macroblocks include quantization, address and type information. Note that even though a frame is predictive encoded, if no reasonable block matches can be found, a particular block or macroblock in the predictive frame may be intraframe coded. In addition certain ones of the macroblocks may not be encoded. Macroblocks are skipped by increasing the address of the next coded macroblock.

After the video data is coded, it is arranged according to an MPEG-like protocol. The MPEG hierarchical format includes a plurality of layers each with respective header information as shown in FIG. 2. Nominally each header includes a start code, data related to the respective layer and provision for adding header extensions. Much of the header information (as indicated in the referenced MPEG document) is required for synchronization purposes in an MPEG systems environment. For purposes of providing a compressed video signal for a digital HDTV simulcast system, only descriptive header information is required, that is start codes and optional extensions may be excluded.

When referring to the MPEG-like signal produced by the present system what is meant is that a) successive fields/frames of video signal are encoded according to an I, P, B coding sequence, and b) coded data at the picture level is encoded in MPEG-like slices or group of blocks albeit that the number of slices per field/frame may differ and the number of macro blocks per slice may differ.

The coded output signal of the present system is segmented in groups of fields/frames (GOF) illustrated by the row of boxes L1 (FIG. 2). Each GOF (L2) includes a header followed by segments of picture data. The GOF header includes data related to the horizontal and vertical picture size, the aspect ratio, the field/frame rate, the bit rate, etc.

The picture data (L3) corresponding to respective fields/frames includes a header followed by slice data (L4). The picture header includes a field/frame number and a picture code type. Each slice (L4) includes a header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Note each macroblock is comprised of 6 blocks, including four luminance blocks, one U chrominance block and one V chrominance block.

The block coefficients are provided one block at a time with the DCT, DC coefficient occurring first followed by respective DCT AC coefficients in the order of their relative importance. An end of block code EOB is appended at the end of each successively occurring block of data.

Compressed video data hierarchically formatted as indicated in FIG. 2 is applied to a priority processor, wherein the coded data is parsed between a high priority channel HP and a low priority channel LP. High priority information is that information, the loss or corruption of which, would create the greatest degradation in reproduced images. Stated conversely, it is the least data needed to create an image, albeit less than a perfect image. Low priority information is the remaining information. The high priority information includes substantially all of the header information included in the different hierarchical levels plus the DC coefficients of the respective blocks and a portion of the AC coefficients of the respective blocks (level 6, FIG. 2).

For priority processing purposes, the respective types of encoded data are assigned priority classes or types. For example all information above slice header information (including the slice identifier, slice quantization parameter etc.) are assigned priority type "0". Macroblock header data is assigned priority type "1". Motion vectors are assigned priority type "2". Priority type "3" may be reserved. The coded block pattern is assigned priority type "4". DC DCT coefficients are assigned priority type "5" and successive codewords representing higher order DCT coefficients are assigned priority types "6" to "68". The priority processor determines, according to the relative amounts of higher and lower priority data, the priority types which will be allocated to the high and low priority channels. Note that the priority classification is indicative of the relative importance of the particular types of data with priority type "0" being the most important. The processor in effect determines a priority break point (PBP) which corresponds to the class or type number above which all data is designated to the low priority channel. The remaining type data is allocated to the high priority channel. Refer to FIG. 2 and assume that for a particular macroblock the PBP is determined to be "5", so that the DC coefficients and all hierarchically higher data is to be allocated to the HP channel, and all AC coefficients and the EOB codes are assigned to the LP channel. For transmission purposes all the HP codewords are concatenated in bit-serial form without demarcation of data from respective blocks. In addition, the codewords are variable length encoded and there are no separations between codewords (in order to realize the greatest effective bandwidth in a limited bandwidth channel). The PBP for corresponding macroblocks is transmitted so that the receiver has the requisite information for separating the HP data amongst the respective blocks. In the LP channel, data from respective blocks is separated by EOB codes.

The HP and LP compressed video data are applied to a transport processor which a) segments the HP and LP data streams into respective HP and LP transport blocks, b) performs a parity or cyclic redundancy check on each transport block and appends the appropriate parity check bits thereto, and c) multiplexes the auxiliary data with the HP or LP video data. The parity check bits are utilized by the receiver for isolating errors in conjunction with synchronizing header information and for providing error concealment in the event of uncorrectable bit errors in the received data.

FIG. 3 illustrates the format of the signal provided by the transport processor. Respective transport blocks may include more or less than a slice of data. Thus a particular transport block may include data from the end of one slice and data from the beginning of the next subsequent slice. Transport blocks including video data may be interleaved with transport blocks containing other data, e.g., audio. Each transport block includes a service type header ST which indicates the type of information included in the respective transport block. In this example the ST header is an 8-bit word which indicates whether the data is HP or LP, and whether the information is audio, video or auxiliary data.

Each transport block includes a transport header TH immediately following the ST header. For the LP channel the transport header includes a 7-bit macroblock pointer, an 18-bit identifier and a 7-bit record header (RH) pointer. The transport header of the HP channel includes only an 8-bit record header (RH) pointer. The macroblock pointer is used for segmented macroblock or record header components, and points to the start of the next decodable component. For example, if the particular transport block includes macroblock data associated with the end of slice n and the beginning of slice n+1, the data from slice n is placed adjacent the transport header and the pointer indicates that the next decodable data is adjacent the transport header TH. Conversely, if a record header RH is adjacent the TH, the first pointer indicates the byte position following the record header RH. A zero valued macroblock pointer indicates that the transport block has no macroblock entry point.

The transport block may include none, one or more than one record header. A record header occurs at the beginning of each slice of macroblock data in the HP and LP channel. No record headers are included in transport blocks that include only video data header information. The record header (RH) pointer points to the byte position containing the start of the first record header in the transport block. A zero valued RH pointer indicates that there are no record headers in the transport block. If both the record header pointer and the macroblock pointer are zero valued, this state indicates that the transport block includes only video data header information.

The 18-bit identifier in the LP transport header identifies the current frame type, the frame number (modulo 32), the current slice number, and the first macroblock contained in the transport block.

Following the transport header is either a record header, RH, or data. As indicated in FIG. 3 the record header for the video data in the HP channel includes the following information: A 1-bit FLAG which indicates if a header extension, EXTEND, is present. Following the FLAG is an identifier IDENTITY, which indicates a) the field/frame type I, B or P; b) a field/frame number (modulo 32) FRAME ID; and c) a slice number (modulo 64) SLICE IDENTITY. Following the identifier the record header includes a macroblock priority break point indicator, PBP. The PBP indicates the codeword class, developed by the analyzer 152 of the priority selector, for dividing the codewords between the HP and LP channels. Lastly, an optional header extension may be included in the HP record header.

The record header incorporated in the LP channel includes only an identifier, IDENTITY, similar to the identifier implemented in the HP channel.

Each transport block is terminated with a 16-bit frame check sequence, FCS, which is calculated over all bits in the transport block. The FCS may be generated using a cyclic redundancy code.

The transport blocks of information are applied to respective forward error encoding elements which a) perform REED SOLOMON forward error correction encoding independently to the respective data streams; b) interleave blocks of data to preclude large error bursts from corrupting a large contiguous area of a reproduced image; and c) appends, e.g., Barker codes to the data for synchronizing the data stream at the receiver.

A receiver, responsive to transmitted signals which are formatted as indicated above, includes apparatus for performing inverse prioritization and inverse coding. Inverse prioritization, or recombining of the HP and LP data must be performed before decoding can be accomplished, because the decoder expects to see data in a predetermined format (similar to that shown in FIG. 2). It should readily be appreciated that at least a portion of the received signal will be corrupted by the transmission process. Consider that the PBP code in a HP transport block is lost. Without this PBP code, information corresponding to the respective blocks of a macroblock cannot be separated. As a result a considerable portion of the information contained in the HP transport block may be rendered useless. In addition information in the LP transport block, corresponding to blocks contained in the HP transport block, is also rendered unusable. In fact, the loss of a single PBP codeword contained in a HP transport block can render otherwise valid data for an entire slice useless. A second example is the loss of, for example, the codeword in a picture header which designates the frame coding type. Without this codeword an entire frame of coded data is rendered unusable or at least unreliable.

SUMMARY OF THE INVENTION

The present invention is apparatus in a digital video signal processing system, for concealing errors which might occur in reproduced images due to image data lost during signal transmission. The system includes apparatus for detecting transmitted video data, generating error signals if errors are present in segments (transport blocks) of the received data, and excising segments having errors from the data stream. The received data is applied to a decoder/decompressor system which decodes and decompresses the transmitted video data according to a predetermined sequence and applies the decompressed video data to a memory (for subsequent display or recording, etc.). The decoder/decompressor is responsive to the error signals for replacing blocks of data in which errors occurred with substitute data. The substitute data comprises compressed data in a particular embodiment, and both compressed data and decoded spatio-temporally related data in a further embodiment.

In a particular embodiment, the received data is provided in two data streams of variable length codewords (without codeword boundaries), which data streams were derived from a single data stream according to a particular hierarchy, the first and second received data streams including data of greater and lesser importance respectively. The data in each of the two data streams occur in respective segments and are independently checked for errors and excised if errors occur. The two data streams are applied to a variable length decoder for determining codeword boundaries and recombining the two data streams into a single data stream. The variable length decoder, responsive to error signals which indicate that segments of the data of lesser importance have been excised, substitutes data corresponding to a predetermined value, for the excised data in the recombined data stream.

DETAILED DESCRIPTION

Figure 4:
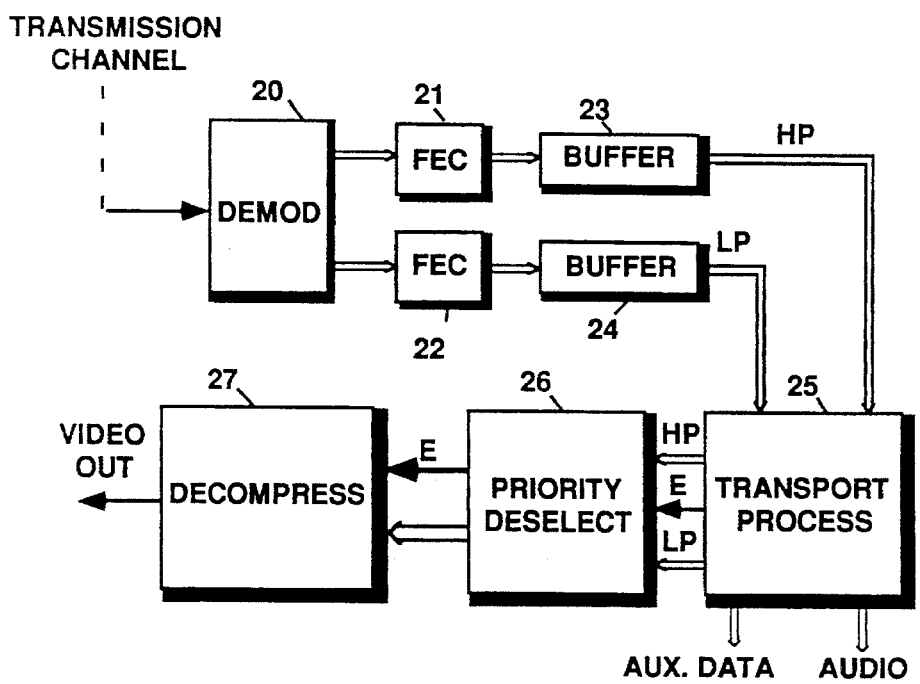
FIG. 4 is a block diagram of a portion of a HDTV receiver including error concealment apparatus.

Referring to FIG. 4, transmitted signal is coupled to a demodulator 20 which provides two signals corresponding to a higher priority, HP, and lower priority, LP, video data. These two signals are applied to respective REED SOLOMON error correcting decoders 21 and 22. The error corrected signals are coupled to rate buffers 23 and 24 which receive data at a constant rate and output data at a variable rate commensurate with the requirements of the subsequent decompression circuitry. The variable rate HP and LP data is applied to a transport processor 25 which performs a further error check, separates the respective types of transmitted data (Aux., Audio, and Video) and separates the respective transport block headers from the service data. The video service data and corresponding error data and transport header data are applied to a priority deselect processor 26, which reformats the HP and LP data into an hierarchically layered signal which is applied to a decompressor 27. The decompressor 27 converts the compressed signal into a signal suitable for display or storage.

Figure 5:
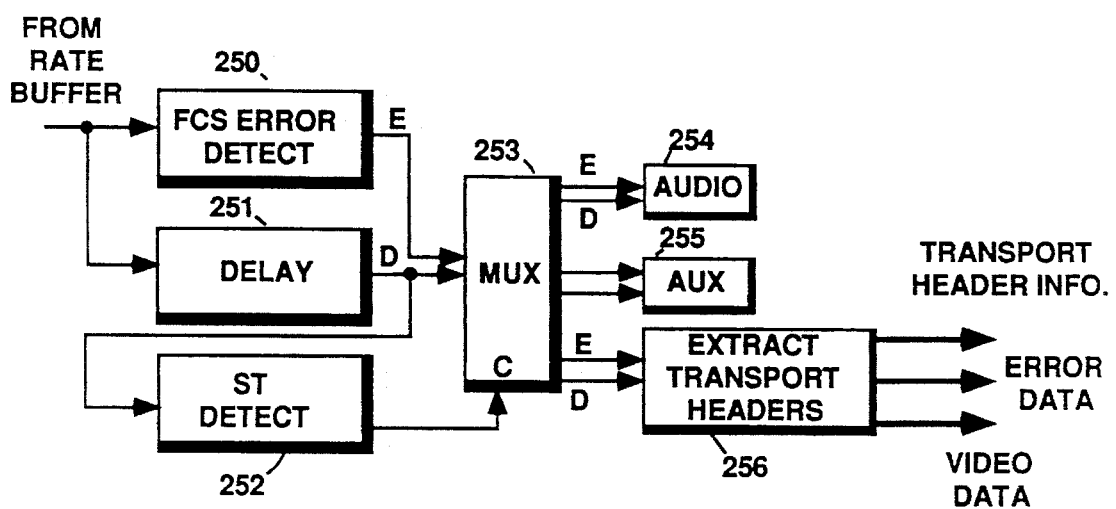
FIG. 5 is a block diagram of apparatus for processing received transport blocks, and providing error signals.

FIG. 5 illustrates the transport processor 25 included in the receiver portion of the system. Two such processors are required, one for the HP channel and one for the LP channel. If it is known a priori that audio or auxiliary data will always be excluded from a particular channel, the corresponding elements may be eliminated from such channel transport processor.

In FIG. 5 data from the rate buffer 23 or 24 is applied to an FCS ERROR detector 250 and a delay element 251. Delay element 251 provides a delay of one transport block interval to allow the detector 250 to determine if any errors are present in the corresponding transport block. The detector 250 determines if any errors occured which were not correctable by the REED SOLOMON decoders 21 and 22, and provides an error signal E indicating the presence or absence or errors in the transport block. The error signal is applied to the input port of a one-to-three demultiplexer 253. The delayed transport block data is also applied to the input port of the multiplexer 253. Delayed transport block data is also coupled to a service type detector (ST DETECT) 252, which examines the ST header and responsive thereto conditions the multiplexer 253 to pass the transport block data and corresponding error signal to the appropriate one of the audio, auxiliary or video signal processing paths.

In the video signal processing path, the transport block data and error signal are coupled to a processing element 256 which excises the FCS code and the transport block headers ST, TH and RH from the data stream. It is also arranged to delete entire transport blocks of video data in which errors have been detected. Element 256 provides the video data with transport block headers excised, the error data and the transport headers to the priority deselect processor 26 on separate busses.

The FEC circuits 21 and 22 provide the received data in fixed length words corresponding to fixed length words provided to the FEC circuits in the encoder. As such the transport block header data occurs on byte boundaries which are either predetermined (ST, TH and FCS) or are identified (RH) by the transport header. Thus it is a relatively simple matter to identify and extract the requisite transport block headers from respective transport blocks.

Figure 6:
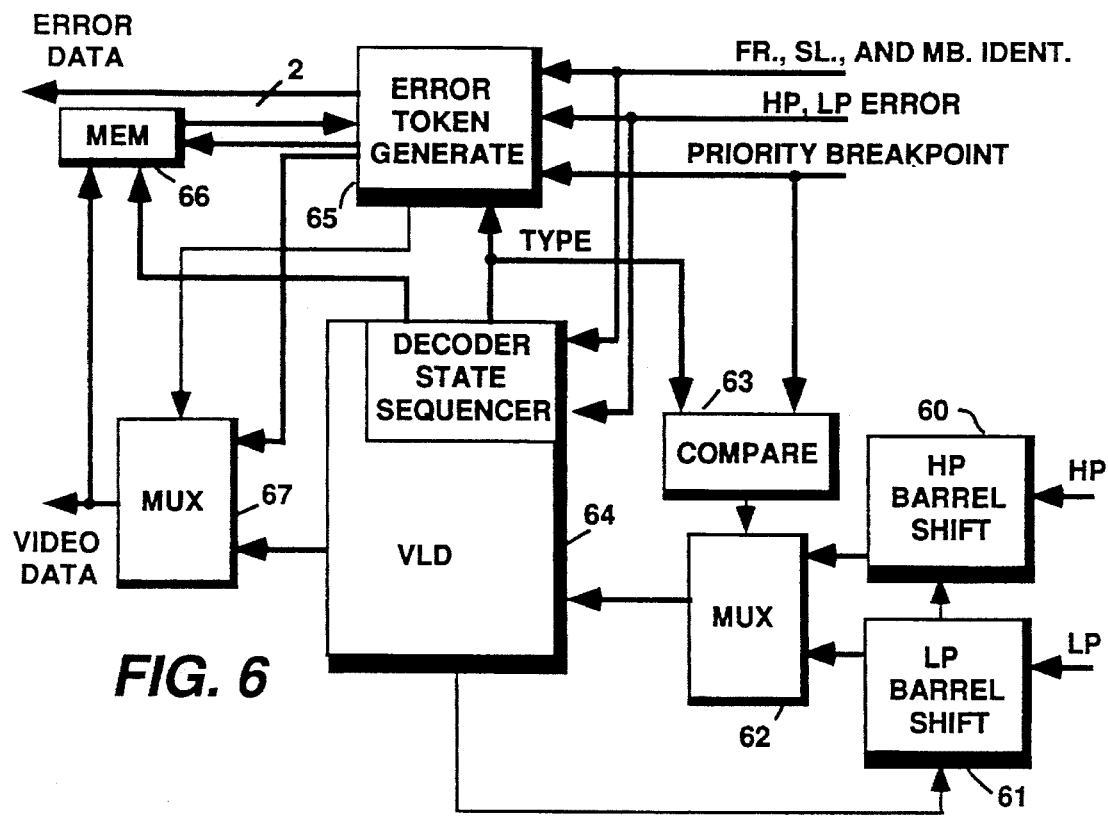
FIG. 6 is a block diagram of a HP/LP signal combiner.

FIG. 6 illustrates an exemplary priority deselect processor. The priority deselect processor accepts data from the receiver transport processor and reconfigures the HP and LP data to a single data stream. In order to do so respective codewords of the data stream have to be identified, that is the classes or types of codewords in each block must be detectable. Since the data is in the form of concatenated variable length codes, it must be at least partially VLC decoded to define the codeword boundaries and the codeword types. Once the codeword boundaries and corresponding types are determined, the data priority break points, PBP's (in the HP channel) can be determined. Thereafter the HP data can be allocated between respective blocks and parsed into respective parallel-bit VLC code form. LP data corresponding to successive blocks may be distinguished by means of the EOB codes. However VLC decoding of the LP data is necessary to recognize the EOB codes and to parse the concatenated data into separate codewords. Detection of the EOB codes causes the processor to return to the high priority channel. In addition, by counting the occurrence EOB codes the processor may determine when to expect new header data be it for macroblock, slice, frame etc.

Depending upon the configuration of the decompressor 27 the output data provided by the priority deselect apparatus will take different forms. For example, if the decompressor is an MPEG-like decompressor which includes variable length decoding, VLD, circuitry, the deselect circuitry will be configured to provide output data in VLC form. Alternatively, the deselect circuitry may be subsumed in the decompressor 27 and provide the VLD function of the decompressor, in which case the output codewords will be in variable length decoded form.

FIG. 6 illustrates an exemplary generalized priority deselect apparatus which may be arranged to provide either variable length encoded or decoded video output data. In FIG. 6 the HP and LP data provided by the transport processor 25 is presumed to occur in fixed codeword lengths. These codewords are applied to respective barrel shifters 60 and 61. The barrel shifters concatenate ones of the fixed length codewords and apply combinations of databits to decoding tables included in the VLD 64 via the multiplexer 62. The form of the output data from the VLD will be determined by the decoding tables. This type of variable length decoding is known to those skilled in the compression arts and a more detailed description of variable length decoding may be found in the article "An Entropy Coding System for Digital HDTV Applications", by Lei and Sun, *IEEE TRANSACTIONS ON CIRCUITS AND SYSTEMS FOR VIDEO TECHNOLOGY, VOL. 1, NO. 1, March 1991.*

Figure 1:
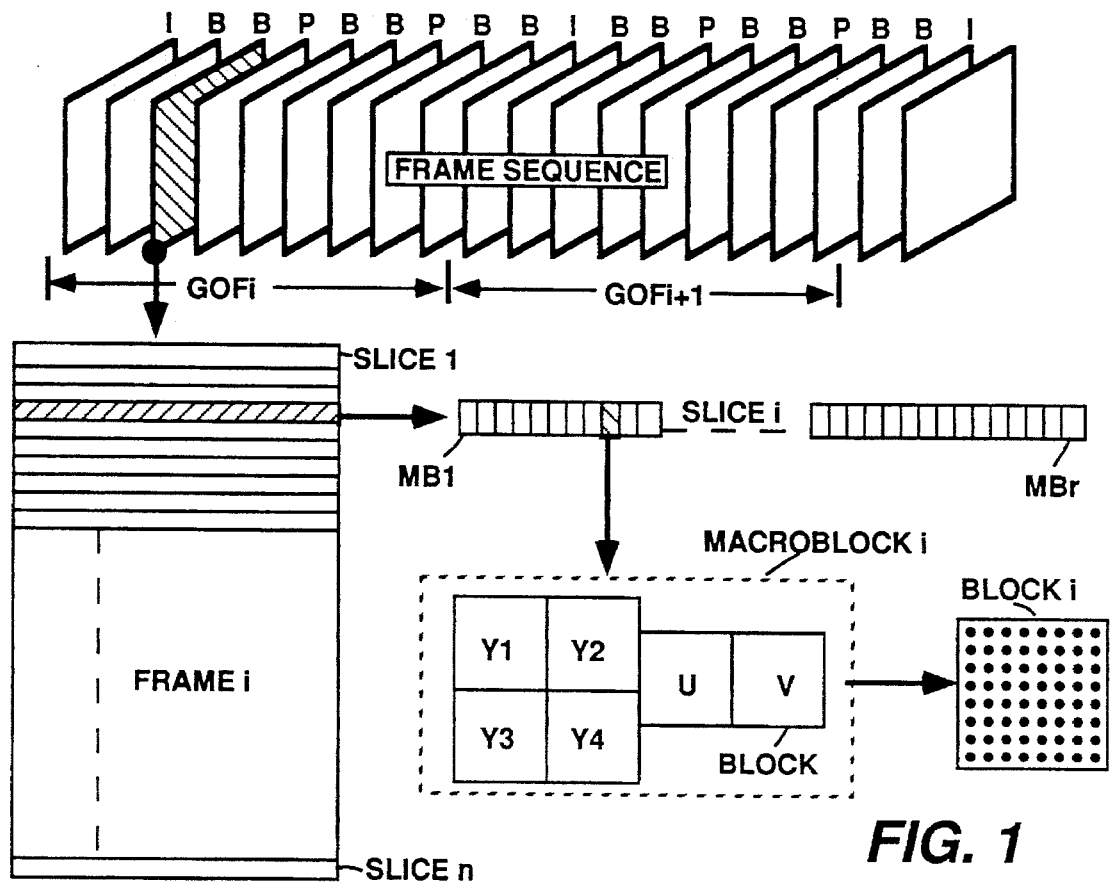
FIG. 1 is a pictorial representation of the MPEG-like signal coding hierarchy.
Figure 2:
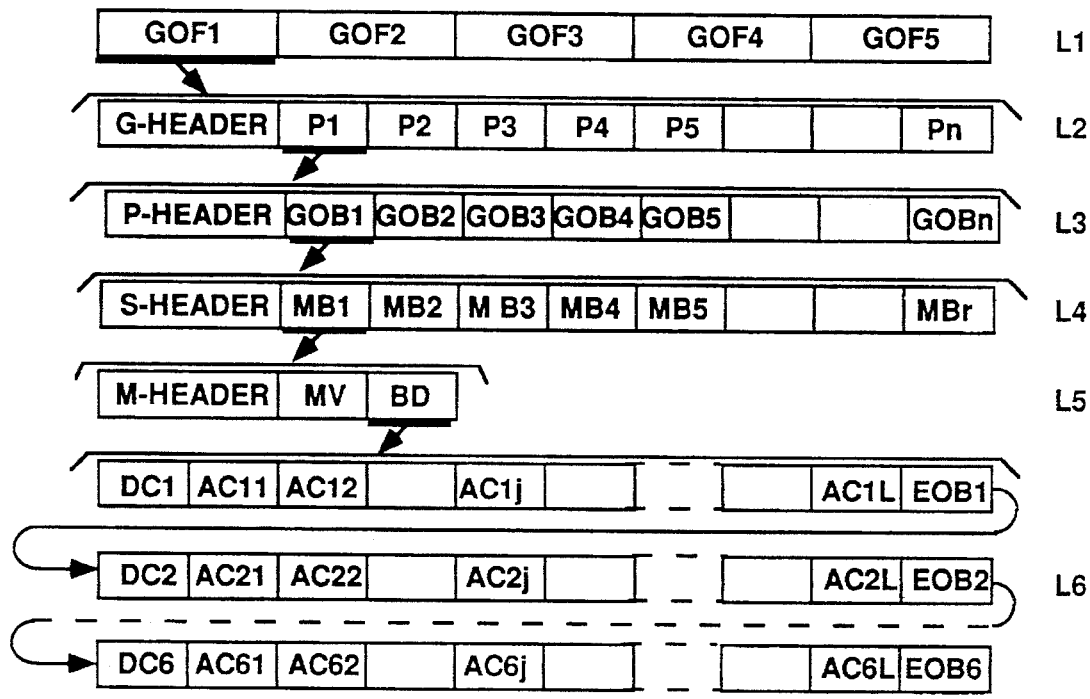
FIG. 2 schematically indicates an MPEG-like signal format.
Figure 3:
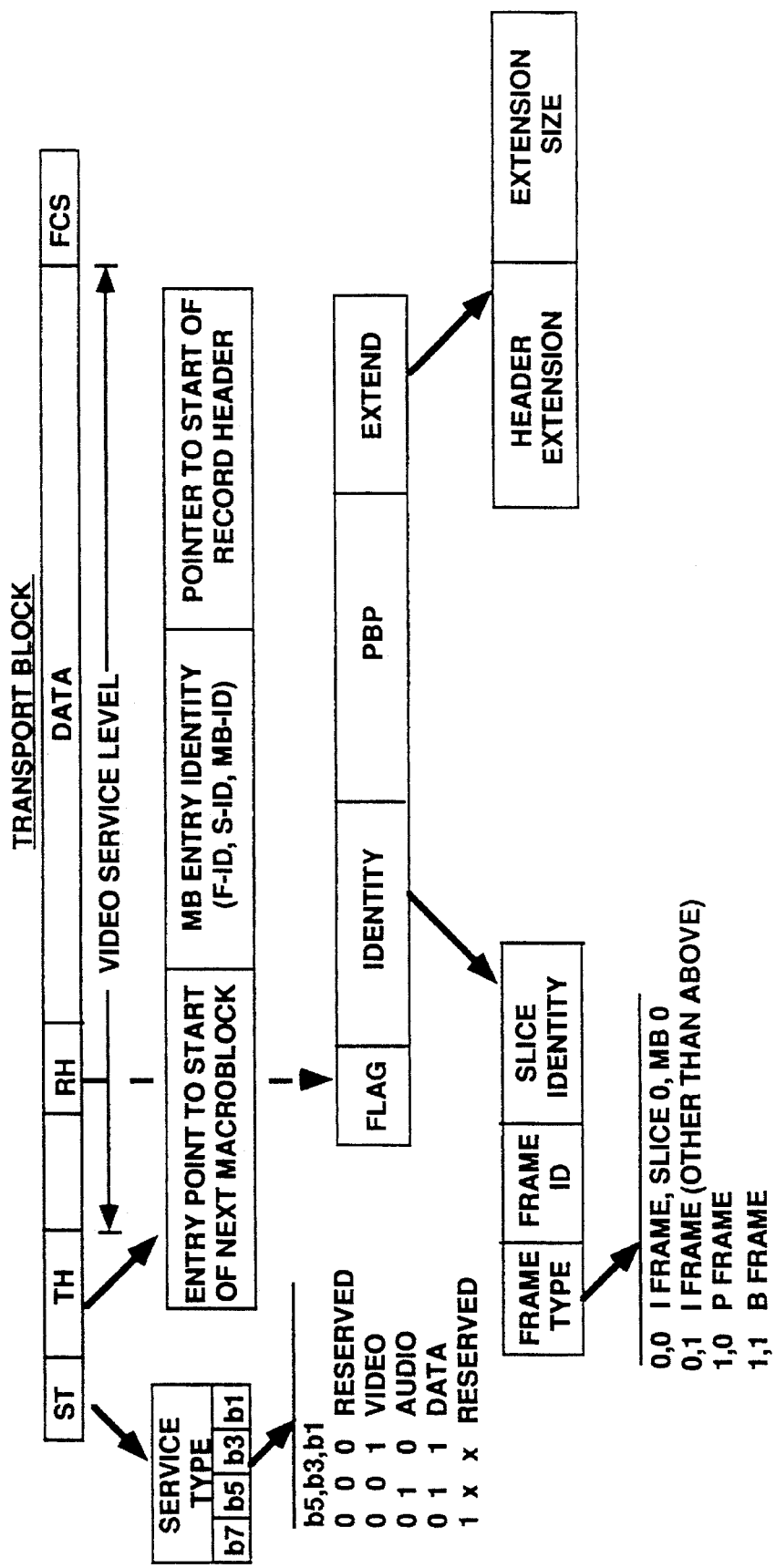
FIG. 3 is a diagram of a segment of signal arranged for transmission.

The VLD 64 is programmed to accept HP data from the multiplexer 62 until a priority break is encountered and then accepts data from the LP channel until an EOB is encountered, at which time it again accepts data from the HP channel and so on. More specifically, the VLD includes a state machine (decoder state sequencer) which is programmed to control the decoding sequence. The state sequencer is programmed to control the VLD in accordance with an expected input data sequence, for example conforming to the data format of FIG. 2. The header data provided by the transport processor is coupled to the state sequencer to initialize respective ones of the control sequences programmed in the device. Once synchronized to a particular point in the data sequence, for example the beginning of a frame or the beginning of a slice etc. the sequencer provides the requisite control functions to decode the subsequently occurring data. In addition as respective codewords are decoded, the state sequencer is programmed to output a signal indicating the expected class or type of the next occurring codeword. The "type" signal is applied to one input terminal of a comparator circuit 63. The priority break point, PBP, code available from the transport processor is applied to a second input terminal of the comparator. The output of the comparator conditions the multiplexer 62 to pass HP data to the VLD 64 as long as the "type" signal from the state sequencer is less than the PBP signal and to pass the LP signal otherwise.

The recombined HP and LP video data provided by the VLD 64 is applied to a multiplexer 67 and output to the decompressor 27 in the absence of any error indications. If errors have been detected substitute video data, provided by an error token generator 65, is output from the multiplexer 67.

The error token generator, 65, is for example a microprocessor which is programmed to respond to the header information included in the transport blocks, the state of the VLD and to the error indications. The error token generator 65 may include a table of substitute data which simulates compressed video data. This data corresponds to particular data that is recognizable by the MPEG-like decompressor. The error token generator is also provided with data from a memory 66 which may be substituted for excised video data. In particular, the memory 66, responsive to the state sequencer of the VLD, is loaded with motion vectors corresponding to, for example, the motion vectors of macroblocks in the previous slice of data.

The motion of image objects will occur across macroblock boundaries. In addition errors will propogate or occur along the horizontal direction. Thus it is likely that motion vectors from vertically adjacent blocks will be similar, and the substitution of motion vectors from vertically adjacent macroblocks will result in acceptable error concealment. Similarly the DC DCT coefficients from vertically adjacent blocks can be expected to be similar. As such they may also be stored in the memory 66 for substitution of lost DC coefficients.

Storage of data in the memory 66 is controlled by the state sequencer. The sequencer is programmed to condition the VLD to output data according to a predetermined sequence, and thus can provide the appropriate signals to fetch the desired types of data when it is output from the VLD. This data may be written into the memory at predetermined address locations which may be accessed by the error token generator.

The error token generator monitors the transport header data and the error signal to determine when and what data is lost, and responsive to lost data, substitutes data on a macroblock basis. Sequences of predetermined types of data are preprogrammed for substitution depending on the frame type and the type of data that is lost. For example, macroblocks carry particular addresses and occur in a predetermined sequence. The error token generator, responsive to the header data determines if there is a break in the normal sequence of macroblocks and provide substitute macroblocks for missing macroblocks.

Figure 7:
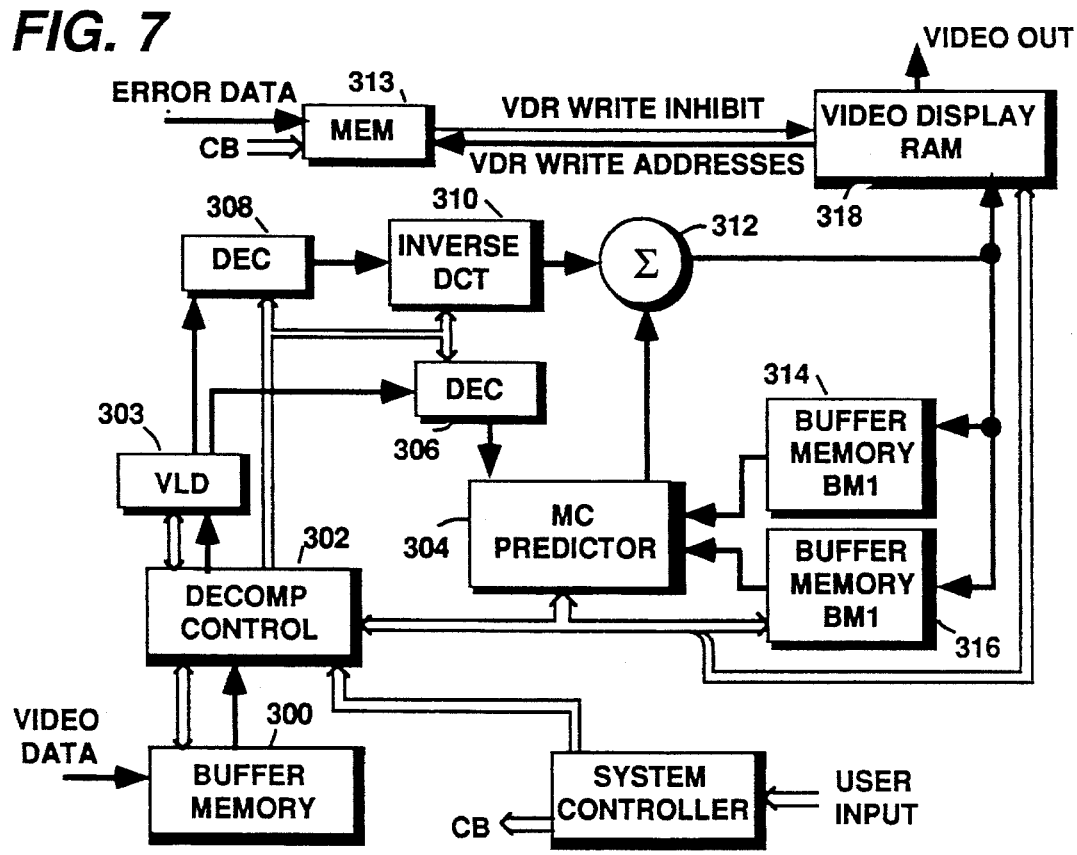
FIG. 7 is a block diagram of exemplary circuitry which may be implemented for the decompression circuit 27 of FIG. 4.

Before discussing specific examples of the substitution data provided by the error token generator 65, it is beneficial to describe an MPEG type decompressor. Refer to FIG. 7 which shows the general form of an exemplary MPEG type decompressor.

The video data provided by the multiplexer 67 of the priority deselect processor is applied to a buffer memory 300. This data is accessed by the decompression controller 302 and applied to a variable length decoder, VLD, 303 which variable length decodes the data applied thereto. Header data is extracted to program the controller 302. The variable length decoded codewords corresponding to DCT coefficients are extracted and applied to a decoder 308 and the variable length codewords corresponding to motion vectors are applied to the decoder 306. The decoder 308 contains apparatus for performing inverse run length decoding and inverse DPCM coding as appropriate under the control of the controller 302. Decoded data from the decoder 308 are applied to an inverse DCT circuit 310 which includes circuitry to inverse quantize the respective DCT coefficients and to convert the coefficients to a matrix of pixel data. The pixel data is then coupled to one input of an adder 312, the output of which is coupled to the video display ram 318 and buffer memories 314 and 316.

The decoder 306 includes circuitry to perform inverse DPCM coding of the motion vectors as appropriate under the control of the controller 302. Decoded motion vectors are applied to a motion compensated predictor 304. Responsive to the motion vectors the predictor accesses corresponding blocks of pixels stored in one (forward) or both (forward and backward) of the buffer memories 314 and 316. The predictor provides a block of data (from the one of the buffer memories) or an interpolated block of data (derived from respective blocks from both buffer memories) to a second input of the adder 312.

Decompression is performed as follows. If a field/frame of input video data is intraframe encoded there are no motion vectors and the decoded or inverse transformed DCT coefficients correspond to blocks of pixel values. Thus for intraframe encoded data the predictor 304 applies a zero value to the adder 312 and the inverse transformed DCT coefficients are passed unaltered by the adder 312, to the video display RAM where they are stored for readout according to normal raster scanning. The decoded pixel values are also stored in one of the buffer memories 314 and 316 for use in forming predicted image values for decoding motion compensated frames (B or P).

If a field/frame of input data corresponds to a forward motion compensated P field/frame, the inverse transformed coefficients correspond to residues or differences between the present field/frame and the lastmost occurring I frame. The predictor 304, responsive to the decoded motion vectors accesses the corresponding block of I frame data stored in either buffer memory 314 or 316 and provides this block of data to the adder wherein respective blocks of residues provided by the inverse DCT circuit 310 are added to the corresponding block of pixel data provided by the predictor 304. The sums generated by the adder 312 correspond to the pixel values for the respective blocks of the P field/frame, which pixel values are applied to the display RAM 318 to update respective storage locations. In addition the pixel values provided by the adder 312 are stored in the one of buffer memories 314 and 316 not storing the I field/frame of pixel data utilized to generate the predicted pixel data.

For bidirectionally encoded (B) field/frames the operation is similar, except predicted values are accessed from the stored anchor frames (I or P) in both buffer memories 314 and 316 depending upon whether the respective motion vectors are forward or backward vectors or both. The generated B field/frame pixel values are applied to update the display RAM 318, but are not stored in either of the buffer memories, as B field/frame data is not utilized for generating other field/frames of picture data.

A point to note in the MPEG-like signal format is that for P and B encoded frames macroblocks may be skipped. This factor permits some flexibility in error concealment. For macroblocks that are skipped, the decoder effectively copies them from the previous picture into the present picture, or alternatively, for skipped macroblocks the corresponding areas of the video display RAM 318 simply are not updated. Macroblock skipping may be accomplished by coding the motion vectors with zero values and the DCT coefficients with all zero values. On the other hand, in I encoded frames, no macroblocks are skipped. That is, the decoder expects data for all macroblocks in I frames. Thus missing macroblocks cannot be simply replaced with data from the prior frame.

A second point to note is, that when the DCT coefficients are encoded, an EOB code is placed after the last non-zero coefficient. The decoder is programmed to accommodate however many zero valued coefficients occurred between the last non-zero coefficient and the last potential coefficient in a respective block.

A third point to note is that for P and B frames, a larger amount of data corresponding to data higher in the data hierarchy will probably be transmitted in the LP channel than for I frames.

Examples of substitution data provided by the error token generator will now be considered. The type of substitution data is dependent upon the type of frame currently being processed, whether the error occurred in the HP or LP channel, and where in the data stream the error occurred. Consider that an error occurred in the LP channel of an I frame, and that only AC coefficients are being transmitted in the LP channel (the PBP is greater than or equal to 5). In this instance respective EOB codes may be substituted for the AC coefficients that were expected in the LP channel for each block in a macroblock, and each macroblock that was excised in the LP channel. The image resulting from the substituted data will be lacking structure but will have the proper brightness value. Thus, pixels generated from the substitute video data, though somewhat in error, will not produce image artifacts that are particularly noticeable. Alternatively if the PBP is less than 5 the DC DCT coefficient is transmitted in the LP channel. Replacing the lost LP data, in this instance, with EOB's, will provide too little data to the decompressor for it to produce non-objectionable artifacts. In this instance and the case of an HP error the substitute data will include enough information for the decompressor to perform a decoding function on a macroblock basis. That is the decompressor is provided enough data to preclude it from entering an inoperable state, however the reproduced image for the areas for which video data is substituted may bear no relation to the actual image. This substitute data may comprise the macroblock address, the macroblock type, DC DCT coefficients corresponding to a midgray value for respective blocks in the macroblocks and EOB codes for respective blocks in the macroblock. Note that such errors in the I frames will propagate through the GOF if further processes are not initiated, which processes will be discussed further below.

Substitute data provided for the P and B frames may be of similar form. For example assume that data corresponding to only the AC DCT coefficients is lost in the LP channel. As with the I frames an EOB may be substituted for this lost data. Alternatively assume that motion vectors and the hierarchically lesser important data are lost in either or both the LP and HP channels. At least two alternative forms of substitute data may be used. The first may take the form of providing substitute compressed macroblocks with zero valued motion vectors and zero valued DCT coefficients for the excised macroblocks. This will cause pixel data from the prior frame to be effectively substituted for the lost macroblocks. The portion of the reproduced image corresponding to the substituted macroblocks will contain high resolution data, but may suffer a motion anomaly since the rest of the image may be moving relative to the area for which data was substituted. A second form may provide substitute macroblocks having motion vectors selected from vertically adjacent macroblocks, and an indication that the current macroblock was not coded, which means that all of the residue values are considered to be zero valued. In this instance the area of the image under consideration will likely be moving in synchronism with the remainder of the image, however the actual picture detail of this area may be slightly in error. These are tradeoffs to be considered by the system designer when selecting particular substitution signals to be used for various types of lost data. Note the motion vectors from vertically adjacent macroblocks are cyclically stored in and obtained from the memory 66.

Consider also that the DC DCT coefficients may be differentially encoded (DCPM) from macroblock to macroblock. In this case the last macroblock of a sequence of substitute macroblocks will not have a correct DC DCT value for the first non substituted macroblock to reference. The error token generator may therefor be programmed to substitute a DC DCT coefficient in such last substitute macroblocks from a vertically adjacent macroblock (i.e., taken from memory 66) or from a temporally displaced collocated macroblock (taken from an expanded memory 66 arranged to store select compressed data for e.g. an entire frame).

Refer again to FIG. 7. It was indicated above that for I frames and certain types of lost data, substitute data was provided merely to condition the decompressor to continue operating, even though the decoded picture data being generated would tend to be unacceptable. This data is precluded from being written to the display RAM 318 by virtue of an error map provided by the error token generator. During the processing of I frames, the error token generator develops an error map of all substitute data that will be deemed to produce potentially unacceptable images. This error map may consist of a pattern of binary ones and zeroes, corresponding to pixels (or blocks or macroblocks) which are generated from particular substitute data and those which are not. This error pattern is loaded into a memory arrangement 313 at address locations corresponding to address locations of associated pixels in the video display RAM, VDR. As write addresses are applied to the display RAM, these address values are applied to the memory arrangement 313 to address the error pattern. If a particular address location contains an error indication, a signal is produced by the memory arrangement to inhibit writing of new data into the corresponding memory location of the display RAM.

Figure 8:
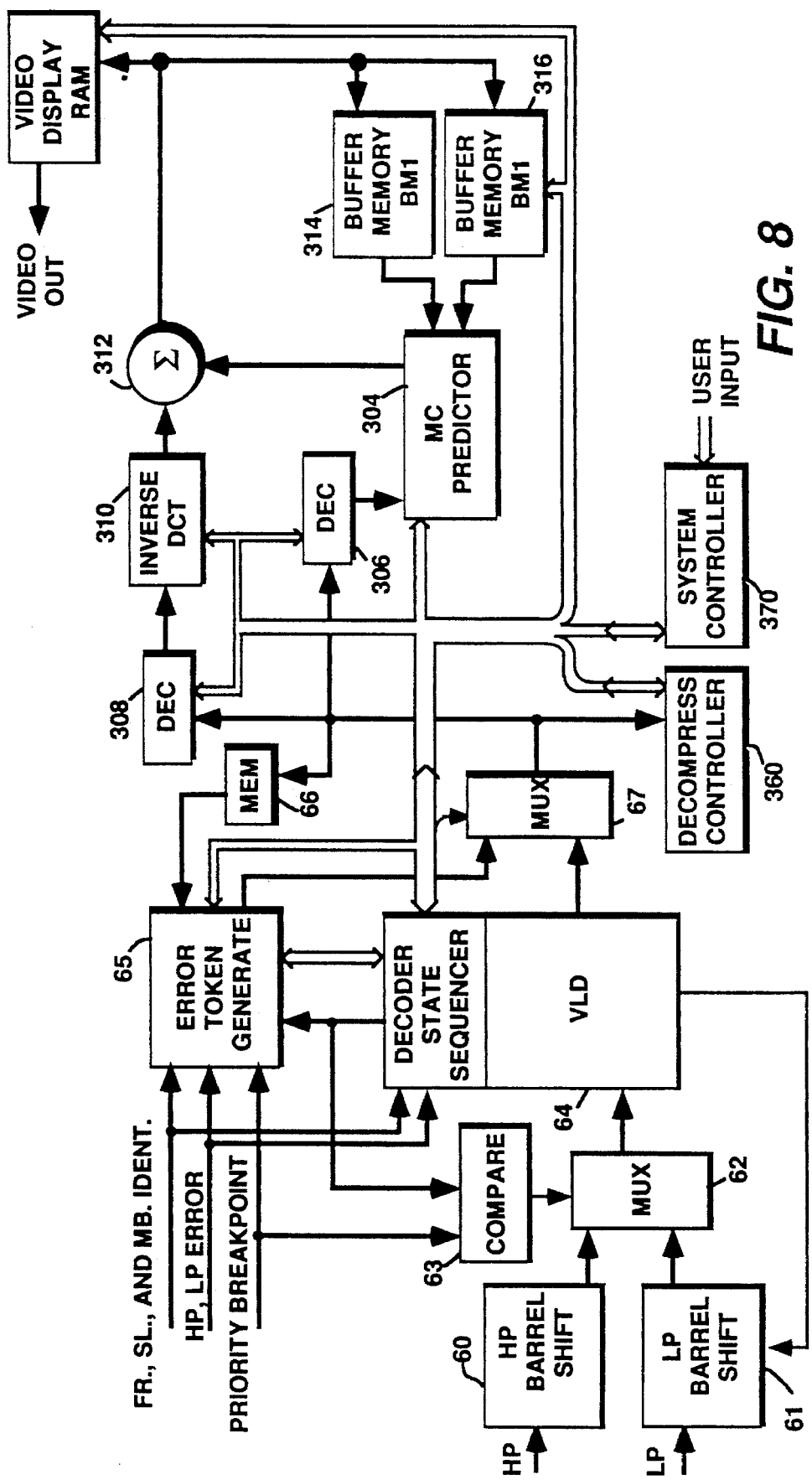
FIG. 8 is a schematic diagram of a combined signal combiner-decompressor.

FIG. 8 shows a further embodiment wherein the priority deselect apparatus and the decompressor share the variable length decoder. This arrangement not only eliminates the need for two VLD's in the system, but also obviates the memory arrangement 313 of FIG. 7. The circuit elements of FIG. 8 which are designated with the same numerals as elements in FIGS. 6 and 7 perform similar functions. In the FIG. 8 circuitry, however, the output words provided by the VLD are in variable length decoded form, and the table of substitute data included in the error token generator is altered to include, for example, skipped macroblocks for I frames. The decompression algorithm for this arrangement conforms substantially to the MPEG decompression algorithm, but with one advantageous exception. The exception is the provision to accept skipped macroblocks in I frames. Allowing the decoder to recognize skipped macroblocks for I frames means that I-frame data will not be updated in the display RAM or the decoding buffer memories (314, 316) for areas corresponding to the skipped macroblocks. This feature obviates the memory arrangement 313 of FIG. 7 and the error map generating function of the error token generator. Thus whereas in the former arrangement substitute I-frame data was configured to merely satisfy the requirement that data be provided for each macroblock, in the FIG. 8 arrangement the error token generator will provide substitute data which will be indicative of skipped macroblocks, and the lost data will be effectively replaced with temporally displaced collocated data. An indication of skipped macroblocks may simply take the form of including in the data stream the next detected valid slice header.

The circuitry of FIG. 8 includes a system controller 370 and a decompressor controller 360. The system controller 370 controls the overall receiver system and is responsive to user input stimuli. This controller conditions the VLD, state sequencer, error token generator, and decompressor controller to initialize on system start-up, to override certain decoding sequences to provide special effects, and to control channel changes etc. The decompression controller 360 controls the decompression circuitry and the display RAM. Video data from the VLD is applied to the controller 360 which is programmed to recognize the various MPEG header data and responsive thereto, to sequence appropriate data through the appropriate decoding functions. Responsive to the macroblock addresses, the controller conditions the display RAM to write corresponding decoded pixel values to appropriate raster areas. Display RAM memory cells corresponding to raster areas represented by skipped macroblocks are periodically refreshed by the controller 360 effecting a temporal replacement in these areas.

Since the FIG. 8 system is arranged to process (or more correctly not process) skipped macroblocks in I, P and B frames, certain special effects may be provided through the error token generator. A freeze frame function may be induced by the user, merely by arranging the system controller to override the error token generator and causing it to substitute video data corresponding to skipped macroblocks for all macroblocks in all frames, or by overriding the decompression controller and conditioning it to treat all macroblocks as if they were skipped. A stroboscopic effect can be provided, by for example, overriding all P and B frames with skipped macroblocks. A partial stroboscopic effect may be realized by programming the controller 370 to condition the error token generator to provide data corresponding to skipped macroblocks in alternate sets of slices The error token generator may be arranged to provide specific substitute video data unrelated to error concealment. The substitute data table may include substitute data for providing certain images under certain conditions. While the receiver is synchronizing to a particular broadcast channel, and no recognizable header data is available from the transport processor, the error token generator may be conditioned to produce substitute data corresponding to, for example, a blue screen or possibly a checkerboard pattern etc. Alternatively, when a channel change is induced, the token generator may be conditioned to freeze the last frame from the prior channel that was being viewed, until the system resynchronizes to the new channel.

The invention has been described in the environment of a two layer or channel system. However those skilled in the art of video signal compression will readily recognize that it may be practiced in single channel systems, and on different compressed signal formats, and the following claims should be considered in this light.

What is claimed is:

1. In a television processing system for converting compressed data representing images into noncompressed data, said compressed data occurring in transport blocks including a plurality of macroblocks, each macroblock containing a plurality of blocks of data, said transport blocks being subject to errors and including codewords from which an indication of an error in a transport block may be determined, apparatus comprising:

a source of transmitted said compressed data;

a detector responsive to said codewords for detecting errors in respective said transport blocks;

circuitry responsive to determination of an error, in a transport block for eliminating said plurality of macroblocks contained in said transport block and replacing such eliminated plurality of macroblocks, at least in part, with predetermined sequences of data in compressed format, which sequences emulate, at least in part, compressed data representing a plurality of macroblocks corresponding to said eliminated plurality of macroblocks; and a decompressor, having an input port coupled to said circuitry, and having an output port for providing decompressed data representing images.

2. The system set forth in claim 1 wherein said decompressor is responsive to said predetermined sequences of compressed data for providing substitute decompressed video signal information for decompressed video signal information corresponding to ones of said blocks of compressed data in macroblocks which were eliminated.

3. The system set forth in claim 1 wherein said circuitry further includes means for including motion vector, derived from neighboring macroblocks, with said predetermined sequences of data.

4. In a television processing system for converting compressed data representing images into noncompressed data, said compressed data occurring as blocks of data and being subject to errors, apparatus comprising:

means for receiving said compressed data and detecting errors therein, and responsive to said errors, replacing blocks of compressed data in which errors occurred with predetermined sequences of data in compressed format which sequences emulate, at least in part, the compressed data in which errors occurred;

decompressing means, having an input port coupled for receiving compressed data from said means for receiving, and having an output port for providing decompressed data;

a memory means coupled to receive decompressed video signal from said decompression means;

means associated with said means for receiving, for generating an error map representing image areas corresponding to one of said blocks which were replaced; and means responsive to said error map for inhibiting said memory means from writing decompressed video data into memory locations corresponding to said ones of said blocks which were replaced.

5. In a television processing system for converting compressed data representing images into noncompressed data, said compressed data occurring as blocks of data and being subject to errors, apparatus comprising:

means for receiving said compressed data and detecting errors therein, and responsive to said errors, replacing blocks of compressed data in which errors occurred with predetermined sequences of data in compressed format which sequences emulate, at least in part, the compressed data in which errors occurred;

decompressing means, having an input port coupled for receiving compressed data from said means for receiving, and having an output port for providing decompressed data, said decompressing means being responsive to said predetermined sequences of compressed data for providing substitute decompressed video signal information corresponding to ones of said blocks of compressed data in which errors occurred; and means responsive to user stimuli for replacing entire frames of compressed video data with substitute compressed video data in order to provide special effects.

6. In a video signal processing system for decompressing transmitted compressed video data, said compressed video data occurring in blocks and subject to incurring errors, apparatus for detecting the occurrence of errors and replacing blocks of compressed video data with predetermined sequences of compressed data emulating, in part, compressed video data; decompression means for decompressing said compressed video data including said predetermined sequences; and means associated with said apparatus for detecting errors and said decompression means for replacing decompressed video data corresponding to ones of blocks of compressed data in which errors occurred, with temporally delayed, spatially collocated decompressed video data.

7. Apparatus for decompressing video data provided in high and low priority channels, compressed video data having been formed in macroblocks each containing a plurality of blocks of data, the data in respective macroblocks and blocks being hierarchically layered, with data through hierarchy level K (a variable) for respective blocks being included in partial blocks of corresponding macroblocks which are arranged in high priority transport blocks in said high priority channel, and the remaining data below hierarchy level K in said respective blocks being included in partial blocks of corresponding macroblocks which are arranged in low priority transport blocks in said low priority channel, respective partial blocks of low priority data having an end of block code and respective partial blocks of high priority data not having an end of block code unless all data for a respective block is contained in the high priority block, and wherein said compressed video data is subject to incurring errors; apparatus for concealing errors in images reproduced from said compressed video data comprising:

means responsive to compressed video data in said high and low priority channels for detecting the occurence of errors and excising transport blocks of information containing errors;

means for combining corresponding partial blocks of high and low priority information, and responsive to excised transport blocks of low priority information for appending end of block codes to corresponding partial blocks of high priority information; and means for decompressing the combined blocks of information to produce a decompressed video signal.

8. The apparatus set forth in claim 7, wherein said means for combining include means for excising partial blocks in the low priority channel corresponding to excised partial blocks in the high priority channel.

9. The apparatus set forth in claim 8 wherein said means for combining further includes:

storage means for storing predetermined sequences of compressed data in compressed video format; and means for replacing excised high priority macroblocks and corresponding excised low priority macroblocks with macroblocks of predetermined sequences of compressed data.

10. The apparatus set forth in claim 7 wherein said means for combining further includes:

storage means for storing predetermined sequences of compressed data in compressed video format; and means for replacing excised high priority macroblocks and corresponding low priority macroblocks with macroblocks of predetermined sequences of compressed data.

11. The apparatus set forth in claim 7 wherein said transport blocks include indicia for identifying at least portions of the information contained in said transport blocks, and said apparatus further includes:

means for separating said indicia from respective transport blocks of information;

means for storing compressed video data from said high priority channel;

storage means for storing predetermined sequences of compressed data in compressed video format; and wherein said combining means includes means responsive to said indicia for replacing excised high priority macroblocks and corresponding low priority macroblocks with macroblocks of said predetermined sequences of compressed data augmented with compressed video data from said means for storing compressed video data.

12. Apparatus for decompressing video data provided in high and low priority channels, compressed video data in said high priority channel arranged in transport blocks containing partial blocks of high priority data, and video data in said low priority channel arranged in transport blocks containing corresponding partial blocks of low priority data, and wherein said compressed video data is subject to incurring errors: apparatus for concealing errors in images reproduced from said compressed video data comprising:

means responsive to compressed video data in said high and low priority channels for detecting the occurrence of errors and excising transport blocks of information containing errors;

means for combining corresponding partial blocks of high and low priority information, and responsive to excised transport blocks of low priority information for appending end of block codes to corresponding partial blocks of high priority information; and means for decompressing the combined blocks of information to produce a decompressed video signal;

memory means coupled to said decompressing means for storing decompressed video signal in raster scan format, said memory being regularly updated with decompressed data from said decompressing means;

means associated with said means for detecting for generating an error map corresponding to image areas represented by compressed video data in ones of transport blocks which have been excised; and means, responsive to said error map, for inhibiting said memory means from updating data in said memory means corresponding to image areas represented by compressed video data in said ones of transport blocks.

* * * * *